(No Model.)
J. C. THOMPSON.
LID FOR TEA POTS, JUGS, &c.
No. 310,478.   Patented Jan. 6, 1885.
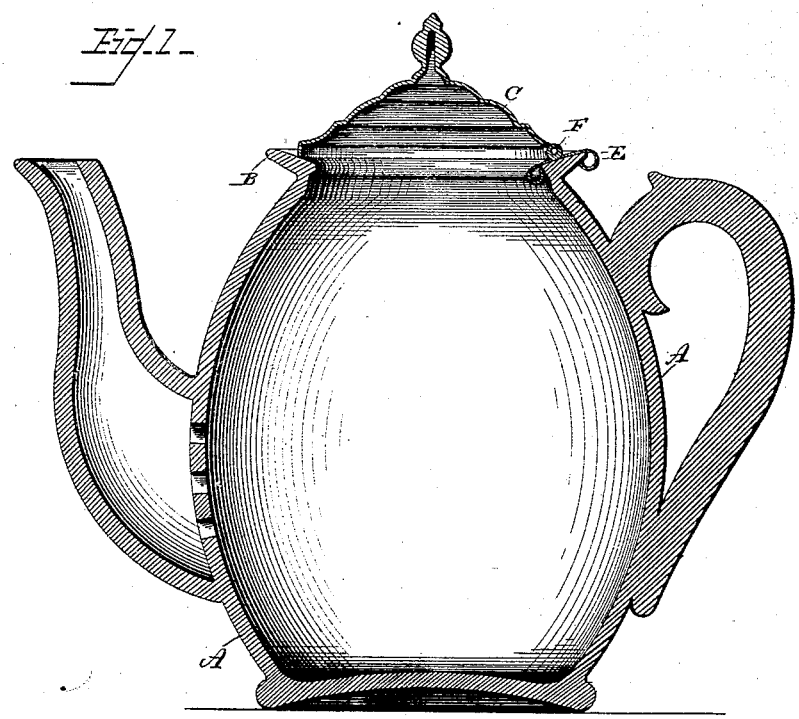
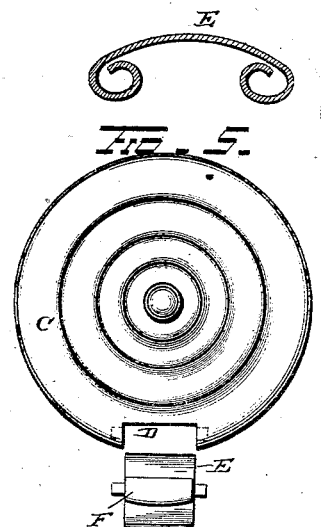
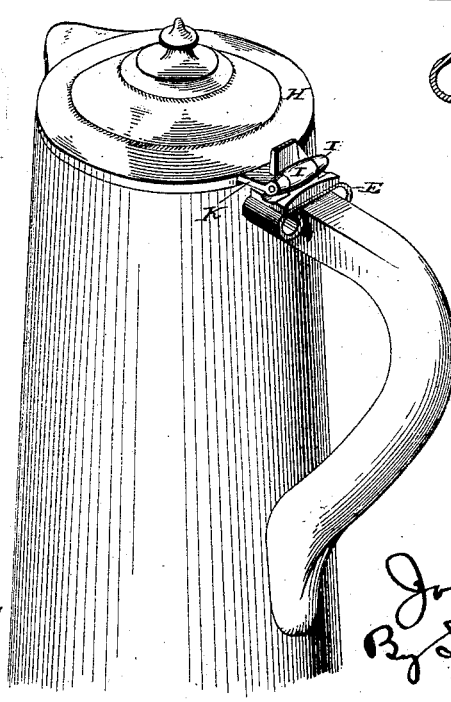
WITNESSES
Franck L. Ourand
Geo. F. Downing
INVENTOR
John C. Thompson
By Leggett & Leggett
Attorneys

UNITED STATES PATENT OFFICE.

JOHN C. THOMPSON, OF EAST LIVERPOOL, OHIO.

LID FOR TEA-POTS, JUGS, &c.

SPECIFICATION forming part of Letters Patent No. 310,478, dated January 6, 1885.

Application filed April 23, 1884. (No model.)

*To all whom it may concern:*

Be it known that I, JOHN C. THOMPSON, of East Liverpool, in the county of Columbiana and State of Ohio, have invented certain new and useful Improvements in Lids for Tea-Pots, Jugs, &c.; and I do hereby declare the following to be a full, clear, and exact description of the invention, such as will enable others skilled in the art to which it appertains to make and use the same.

My invention relates to an improvement in the manner of attaching lids to tea-pots, jugs, and other receptacles.

The object of my invention is to provide a device whereby the lids of vessels may be readily and conveniently attached thereto and removed therefrom without injury to the vessels; and with these ends in view my invention consists in a cover or lid provided with a metallic spring-fastening pivoted thereto, and adapted to clasp the rim or handle of a tea-pot, jug, or other receptacle.

My invention further consists in certain novel features of construction and combinations of parts, which will be more fully described, and pointed out in the claims.

In the accompanying drawings, Figure 1 is a view of my improvement attached to the rim of a tea-pot. Fig. 2 is a view thereof showing my improvement attached to a jug-handle, and Fig. 3 is a sectional view of my improved clamp. Fig. 4 is a modification of my spring-clamp. Fig. 5 is a plan view of the cover with the hinged clamp detached.

A represents an earthenware tea-pot provided with the upper rim or flange, B, adapted to receive the lid C, which may be made of any suitable material, and is provided with a recess, D, on its periphery, in which is pivotally secured the spring-clamp E by means of a pintle which passes through the sleeve F. The spring-clamp E is formed by bending the ends of a band of spring metal toward each other into circular forms, as shown in the drawings. This method of securing the spring-clamp E to the lid is preferably used when it is desired to fasten the lid to a vessel provided with an upper rim or flange. To secure the lid thereto, the coiled ends of the clamp are slightly forced apart and placed over and around the rim B, and upon being relieved will tightly impinge against the rim and hold the lid tightly in position.

In order to remove the lid from the pot, the inner end of the clamp is grasped and raised outwardly, thus relieving its hold, and it becomes detached.

When it is desired to use my improvement on vessels not provided with a proper rim or flange, the construction shown in Fig. 2 is used, which differs from the former in the method of attaching the spring to the lid, and is especially adapted to be fastened to pitchers or jugs having handles formed and resting flush with the opening thereof. In this attachment the spring-clamp E is formed as shown above, and is secured to the lid H by means of the sleeve I, which is secured transversely to the back of the clamp or made integral therewith. The clamp E is fastened to a bifurcated projection, K, formed integral with the top H by means of a pintle, which passes through the sleeve. The projection or plate K, which is cut away to form the shoulders L, is turned upward to form a rest for the lid when it is in a raised or tilted position. The projecting plate K may be of any length sufficient to enable the clamp E to grasp the handle, and at the same time permit the lid to fit evenly over the mouth of a vessel.

The advantages in a lid of this description are numerous, as it is easily and conveniently detached, and may be used on vessels wherein the size of the openings vary—as, for instance, when vessels are molded of a certain size and regular shape and put into a kiln for burning they do not retain uniformity of size, as it is impossible to have every part of a kiln of equal temperature, and those subjected to a hard fire are smaller than those subjected to a soft fire, and consequently the openings vary in size and shape.

This device can be easily adjusted so that it will always be over the center of the opening. It is simple in construction, durable and efficient in use, and can be made at a small initial cost.

It is evident that slight changes in the construction and relative arrangement of the several parts might be resorted to without departing from the spirit of my invention; and hence I would have it understood that I do not confine myself to the exact construction shown and described, but consider myself at liberty to make such changes and alterations as fairly fall within the spirit and scope of my invention.

I am aware that it is old to secure a spring to a vessel, and to provide the hinge-plate to which the cover is pivoted with a downwardly-projecting strap having a flanged end adapted to take under the spring, and with a downwardly-projecting shield adapted to conceal the strap and spring when the parts are secured in position.

In my device the spring, which forms the hinge-plate, and to which the cover is pivoted, is always exposed, so as to enable the cover to be removed and replaced when desired, while in the device above referred to the spring and the strap by which the cover is secured to the vessel are concealed, and hence it is impossible to remove the cover without destroying one or more of the parts.

I am also aware that a sheet-metal strap having a hinge thereon has been secured to the rim of a kettle by turning or bending the opposite ends of said strap over the opposite side edges of a rib formed at the upper edge of said kettle, and hence I make no claim thereto.

Having fully described my invention, what I claim as new, and desire to secure by Letters Patent, is—

1. The combination, with a vessel, of a spring-clamp adapted to be removably secured to the rim or handle of the vessel, and having curved or bent ends, and a cover pivotally secured to said clamp.

2. The combination, with a vessel, of a spring-clamp provided with curved or bent ends, and a cover pivotally secured to said clamp.

3. The combination, with a vessel, of a clamp removably secured to the handle of the vessel, and a lid pivoted to said clamp.

In testimony whereof I have signed this specification in the presence of two subscribing witnesses.

JOHN C. THOMPSON.

Witnesses:
MALACHY HORAN,
C. C. THOMPSON.